(12) United States Patent
Pope et al.

(10) Patent No.: US 6,312,619 B1
(45) Date of Patent: Nov. 6, 2001

(54) METHOD FOR PRODUCING WATER-DISPERSIBLE ALPHA-ALUMINA MONOHYDRATE

(75) Inventors: Dave S. Pope, Dripping Springs; Jimmy D. Brown, Hutto, both of TX (US)

(73) Assignee: Condea Vista Company, Houston, TX (US)

( * ) Notice: Subject to any disclaimer, the term of this patent is extended or adjusted under 35 U.S.C. 154(b) by 0 days.

(21) Appl. No.: 09/329,498

(22) Filed: Jun. 10, 1999

(51) Int. Cl.$^7$ ................. B01F 3/20; B01F 3/22; C09K 3/00
(52) U.S. Cl. ............ 252/363.5; 516/93; 423/625
(58) Field of Search ............ 252/363.5; 516/93; 423/625

(56) References Cited

U.S. PATENT DOCUMENTS

| | | | |
|---|---|---|---|
| 2,260,871 | * 10/1941 | Sawyer | 106/422 |
| 3,357,791 | * 12/1967 | Napier | 423/630 |
| 3,975,509 | * 8/1976 | Royer et al. | 423/626 |
| 4,036,663 | 7/1977 | Williams et al. | 106/308 |
| 4,055,509 | 10/1977 | Weimer | 252/363.5 |
| 4,117,105 | * 9/1978 | Herzenberg et al. | 423/625 |
| 4,186,178 | * 1/1980 | Oberlander | 423/265 |
| 4,202,870 | 5/1980 | Weber et al. | 423/630 |
| 4,242,271 | 12/1980 | Weber et al. | 260/448 |
| 4,244,835 | * 1/1981 | Block | 516/93 |
| 4,564,608 | 1/1986 | Ihara | 502/355 |
| 4,666,614 | * 5/1987 | Block | 507/140 |
| 4,676,928 | 6/1987 | Leach et al. | 252/313.1 |
| 4,705,767 | 11/1987 | Cheng et al. | 502/167 |
| 5,026,796 | 6/1991 | McDaniel et al. | 526/100 |
| 5,178,849 | * 1/1993 | Bauer | 423/626 |
| 5,756,001 | 5/1998 | Mori et al. | 252/313.1 |
| 5,837,634 | * 11/1998 | McLaughlin et al. | 501/127 |

* cited by examiner

*Primary Examiner*—Jill Warden
*Assistant Examiner*—LaToya Cross
(74) *Attorney, Agent, or Firm*—Browning Bushman P.C.

(57) ABSTRACT

A method of enhancing the dispersibility of alpha-alumina monohydrate wherein there is formed a mixture of an alpha-alumnina monohydrate, water, and a dispersibility enhancer comprising an effective amount of a monobasic acid, a salt selected from the group consisting of salts having the formula MX wherein M is a polyvalent metal cation constituent for which the solubility product $K_{SP}$ of the corresponding metal hydroxide is less than $10^{-20}$ and wherein X is an anion constituent derived from a monovalent acid having an ionization constant $K_A$ greater than $10^{+1}$ and certain phosphorus and antimony chlorides, followed by drying the mixture, without aging, to produce a dried, alpha-alumina monohydrate having advanced water dispersibility.

8 Claims, 4 Drawing Sheets

METHOD FOR PRODUCING WATER-DISPERSIBLE ALPHA-ALUMINA MONOHYDRATE

BACKGROUND OF THE INVENTION

1. Field of the Invention

The present invention relates to water-dispersible alumina and, more particularly, to a method for producing an alpha-alumina monohydrate having enhanced water dispersibility.

2. Description of the Prior Art

As is well known, alpha-alumina monohydrate has widespread commercial usage in such applications as abrasives, frictionizing paper surfaces, fiberglass surfaces, and metal surfaces; as static and soil protection agents on wool, nylon, and acrylic carpets; and as dispersing agents in rug shampoos, etc. In such commercial usages, the alumina is typically utilized as a dispersion in an aqueous acidic solution. It has long been known that adding acid to an aqueous alumina slurry that is dried to produce alpha-alumina monohydrate results in a product that is dispersible in water to a high degree. Indeed, in U.S. Pat. No. 4,676,928, incorporated herein by reference for all purposes, there is disclosed a method for enhancing the dispersibility of alumina in an acid solution by aging an alumina slurry containing a monobasic acid at elevated temperatures, e.g., at a temperature above about 70° C. for a period of time sufficient to convert the greater portion of the alumina to a colloidal sol. The advantage of the process disclosed in U.S. Pat. No. 4,676,928 is that it produces an alumina having enhanced water dispersibility but with a generally lower acid content, thus avoiding the problems of corrosiveness and handling inherent in alumina compositions with high acid contents. However, the method still produces an acidic product and, moreover, requires extended aging at elevated temperatures.

U.S. Pat. No. 4,055,509, incorporated herein by reference for all purposes, discloses a process for increasing or enhancing the water dispersibility of alpha-alumina monohydrate by dry mixing alpha-alumina monohydrate with an effective amount of a salt compound, such as, for example, a salt having the formula MX wherein M is a polyvalent metal cation constituent for which the solubility product $K_{SP}$ of the corresponding metal hydroxide is less than $10^{-20}$ and wherein X is an anion constituent derived from a monovalent acid having an ionization constant $K_A$ greater than $10^{+1}$.

SUMMARY OF THE INVENTION

It is therefore an object of the present invention to provide a process for producing an alpha-alumina monohydrate with enhanced water dispersibility.

Another object of the present invention is to provide a process for producing a dispersible alpha-alumina monohydrate that does not require aging an acidified alpha-alumina slurry at elevated temperatures.

Still a further object of the present invention is to provide a process for providing alpha-alumina monohydrates that can be dispersed in water to form substantially neutral sols.

The above and other objects of the present invention will become apparent from the drawings, the description given herein, and the appended claims.

According to the process of the present invention, there is formed a mixture of an alpha-alumina monohydrate, water, and a dispersibility enhancer comprising an effective amount of a salt compound selected from the group consisting of monobasic acids, salts having the formula MX wherein M is a polyvalent metal cation constituent for which the solubility product $K_{SP}$ of the corresponding metal hydroxide is less than $10^{-20}$ and wherein X is an anion constituent derived from a monovalent acid having an ionization constant $K_A$ greater than $10^{+1}$, phosphorus dichloride, phosphorus trichloride, phosphorus pentachloride, phosphorus tribromide, phosphorus pentabromide, antimony pentabromide, and mixtures thereof, followed by drying the mixture at an elevated temperature sufficient to remove free water and produce a dried alpha-alumina monohydrate having enhanced water dispersibility.

DESCRIPTION OF THE PREFERRED EMBODIMENT

Figure 1:
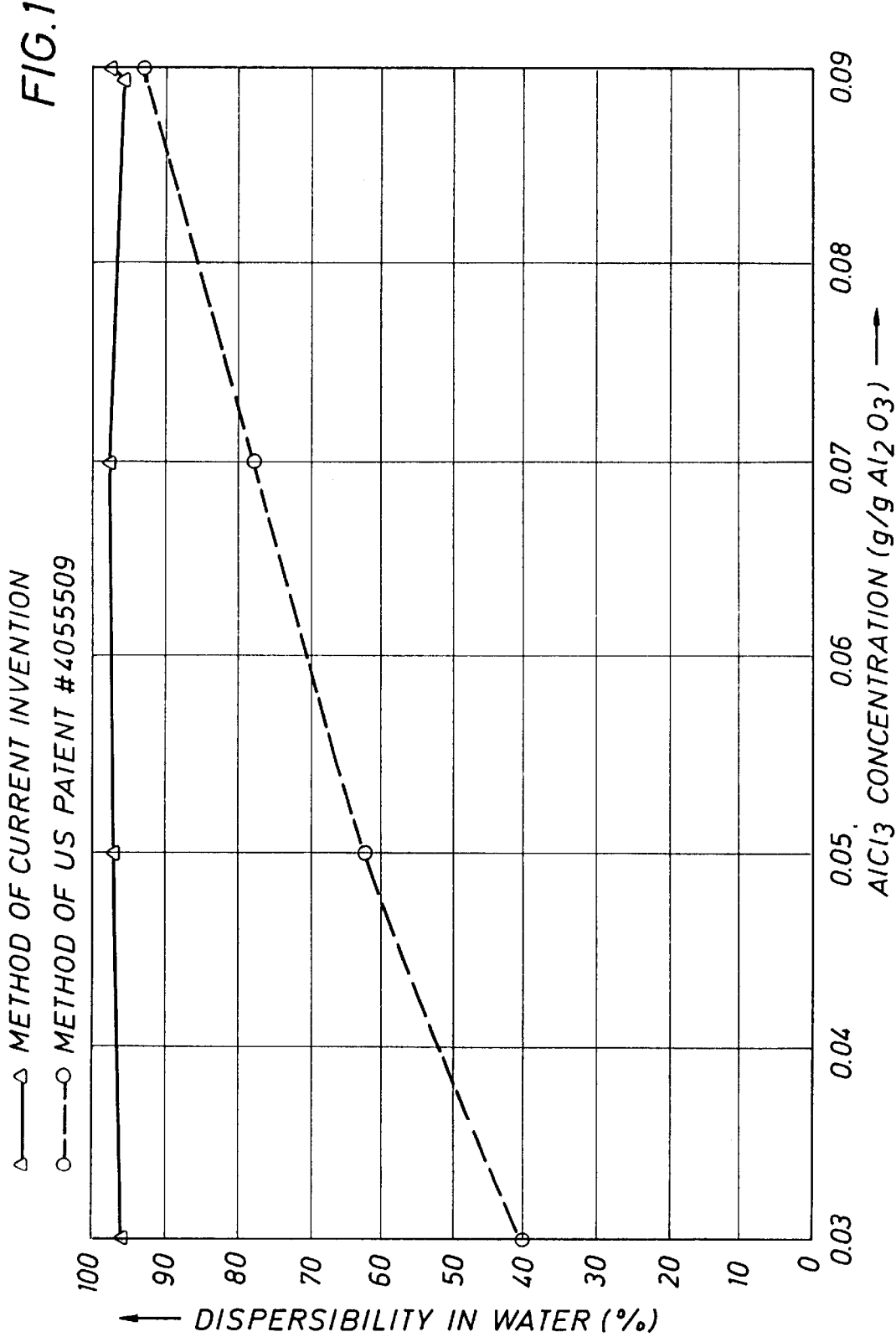
FIG. 1 is a graph showing a comparison of the water dispersibility of an alpha-alumina monohydrate produced by the process of the present invention with an alpha-alumina monohydrate produced by the process of U.S. Pat. No. 4,055,509.

The aluminas that can be treated according to the process of the present invention are alpha-alumina monohydrates that are generally apparently dry products that comprise alpha-alumina monohydrate ($Al_2O_3 \cdot H_2O$) and in addition may contain free water and the like. Such alpha-alumina monohydrates are commonly referred to as pseudo-boehmite or boehmite aluminas. The extent to which the alpha-alumina monohydrate has been dried is indicated by the $Al_2O_3$ content of the monohydrate. Typically, the alpha-alumina monohydrate commercially available contains less than about 86% by weight $Al_2O_3$ and, in most instances, contains less than about 81% by weight $Al_2O_3$. More typically, the $Al_2O_3$ content of commercially available alpha-alumina monohydrates ranges from about 68 to about 75% by weight.

From a dispersibility point of view, when the alpha-alumina monohydrate is dried such that the $Al_2O_3$ content approaches 86% by weight, the product is difficult to extrude, disperse, or otherwise use in any form other than that in which it exists prior to the drying. It is well known that when all the free water has removed from the apparently dry alpha-alumina monohydrate dispersion, extrusion, dispersion, etc., become extremely difficult, and accordingly, most alpha-alumina monohydrate is marketed in a weight range of from 68 to about 75% by weight $Al_2O_3$. However, even at concentrations as low as 50% by weight $Al_2O_3$, the alpha-alumnina monohydrate, which appears to be a dry solid, is not readily dispersible in water. In this regard, dispersibility on the order of 25 to 55% by weight is common, and when the alpha-alumina monohydrate is dried in the range as set forth above—i.e., 68 to 75% by weight $Al_2O_3$—water-only dispersibility on the order of 5 to 20% is not uncommon. As noted above, the dispersibility of the monohydrate alumina can be markedly enhanced by the use of acids.

The alpha-alumina monohydrates useful in the process of the present invention can be produced by techniques such as the water hydrolysis of aluminum alkoxides, the sodium aluminate process, and the alum process, all of which are well known to those skilled in the art. However, it has been found that aluminas obtained by the hydrolysis of aluminum alkoxides are particularly desirable for use in the process of the present invention. Processes for preparing and hydrolyzing aluminum alkoxides are disclosed in U.S. Pat. Nos. 4,242,271 and 4,202,870, incorporated herein by reference for all purposes.

The dispersibility enhancers that have been found to be useful in the process of the present invention include monobasic acids, such as nitric acid, hydrochloric acid, and organic acids having from 1 to 2 carbon atoms, such as formic acid, acetic acid, and the like, as well as salt compounds selected from the group consisting of salts having the formula MX wherein M is a polyvalent metal cation constituent for which the solubility product $K_{SP}$ of the corresponding metal hydroxide is less than $10^{-20}$ and wherein X is an anion constituent derived from a monovalent acid having an ionization constant $K_A$ greater than $10^{+1}$. Additionally, compounds such as phosphorus dichloride, phosphorus trichloride, phosphorus pentachloride, phosphorus tribromide, phosphorus pentabromide, and an antimony pentachloride have also been found to be useful. Particularly preferred of the foregoing are the monobasic acids, such as nitric acid and hydrochloric acid, nitric acid being especially preferred. Also preferred are salts of the formula MX wherein the cations consist of $Sc^{+3}$, $Y^{+3}$, $Nd^{+3}$, $Sn^{+3}$, $Eu^{+3}$, $Gd^{+3}$, $Er^{+3}$, $Tm^{+3}$, $Yb^{+3}$, $Lu^{+3}$, $Ti^{+3}$, $Zr^{+4}$, $Th^{+3}$, $Cr^{+3}$, $U^{+4}$, $Mn^{+3}$, $Fe^{+3}$, $Co^{+3}$, $Ru^{+3}$, $Pd^{+2}$, $Pt^{+2}$, $Au^{+3}$, $Al^{+3}$, $Ga^{+3}$, $In^{+3}$, $Sn^{+2}$, $Sn^{+4}$, $Bi^{+3}$ and the anions are selected from the group consisting of $Cl^-$, $NO_3^-$, $I^-$, $ClO_3$, $ClO_4$, $Br^-$, $MnO_4^-$. Of the phosphorus halide salts listed above, the chloride salts are preferred.

Generally, the mixture of the alpha-alumina monohydrate/dispersibility enhancer/water will contain from about 5 to about 15% by weight alumina calculated as $Al_2O_3$. The dispersibility enhancers are used in an effective amount, which is an amount necessary to impart the desired degree of dispersibility to the alunina. Accordingly, the amount of the dispersibility enhancers in the mixture can vary widely but will generally range from about 0.5 to about 10% by weight, based on the weight of the alpha-alumina monohydrate calculated as $Al_2O_3$.

According to the process of the present invention, an alpha-alumina monohydrate as described above, one or more of the dispersibility enhancers as described above, and water are brought together to form a mixture, generally the dispersibility enhancers being soluble in the water such that there remains an aqueous solution of the dispersibility enhancer and solid alumina particles, which can be in colloidal form. In the prior art processes described in U.S. Pat. No. 4,676,928, and when a monobasic acid was employed, it was necessary for the slurry of alumina and the acid to be aged at a temperature of at least about 70° C., more generally from about 70 to about 100° C. Generally speaking, the aging was conducted for a period of time sufficient to convert the alumina in the slurry to a colloidal sol, the time varying with pH and temperature. However, as seen by the examples in U.S. Pat. No. 4,676,928, aging times of several hours up to several months were necessary. Thus, unlike the process disclosed in U.S. Pat. No. 4,676,928, no aging of the alpha-alumina monohydrate/dispersibility enhancer/water mixture is required. Rather, the mixture is simply dried, e.g., by spray drying or in an oven, at a temperature sufficient to remove substantially all free water and produce a dried solid or powder, the form of the dried material depending upon the type of drying employed. Generally, the drying temperature will range from 60 to 110° C., although higher temperatures can be used provided bound water is not removed—i.e., the monohydrate is not calcined.

The method of the present invention provides several distinct advantages over the prior art techniques discussed above with respect to U.S. Pat. Nos. 4,055,509 and 4,676,928 for enhancing water dispersibility. For one, and as noted above, it is unnecessary to employ long aging times at elevated temperatures. With respect to the method disclosed in U.S. Pat. No. 4,055,509, the present process is a distinct improvement in that the alpha-alumina monohydrate produced has much greater dispersibility and is achieved at lower dispersibility enhancer concentrations.

The method of the present invention can be applied to alumina slurries or alumina powder that is slurried in water. Several distinct benefits flow from the process of the present invention. Since heat treating is not necessary, reaction times can be reduced by growing crystals in the absence of acid and then adding the dispersibility enhancer (salt) once the appropriate crystallite size is reached. Additionally, one can produce a neutral alpha-alumina monohydrate sol since no acid is added when the dispersibility enhancer is one of the salts mentioned above. Using the present invention, one can also disperse small crystallite size alumina without high acid addition. The process of the present invention is also readily adaptable to current continuous processes for producing alpha-alumina monohydrates from the hydrolysis of aluminum alkoxides since the dispersibility enhancers can be added into the alumina slurry recovered from the hydrolysis reaction prior to being sent to a spray drier. Lastly, it is believed that the present invention allows the production of doped aluminas exhibiting catalytic properties. In this regard, zirconium and other metal ions that exhibit catalytic activity in a number of reactions can be incorporated into the alumina by adding the zirconium-containing compound that meets that dispersibility enhancing criteria set out above into the alumina slurry recovered from the hydrolysis reaction such that the mixture of the alumina slurry and the zirconium compound, when spray dried, constitutes a catalytically active species. To more fully illustrate the present invention, the following non-limiting examples are presented.

EXAMPLE 1

A mixture of 25 grams of CATAPAL® B alpha-alumina monohydrate powder marketed by CONDEA Vista Company was mixed with 175.5 grams of water and varying amounts of $AlCl_3$. The mixtures were dried by pan-drying at 60° C. for several hours until a solid containing no free water was obtained. Following the method of U.S. Pat. No. 4,676,928, dry mixtures of the CATAPAL® B alumina and various amounts of aluminum chloride were also formed by blending the two ingredients together to form a generally homogeneous, dry mixture. The dispersibility in water of the aluminas prepared according to the present invention and the aluminas prepared according the method of U.S. Pat. No. 4,055,509 was then compared. The results are shown in FIG. 1. As can be seen from FIG. 1, using the process of the present invention, the alumina has a dispersibility in water of greater than 95% with a range of 0.03 to 0.09 grams of $AlCl_3$ per g of $Al_2O_3$, whereas in the case of the alumina prepared by the method of U.S. Pat. No. 4,055,509, dispersibility ranged from 40% by weight when the $AlCl_3$ content was 0.03 grams per gram of $Al_2O_3$ to greater than 90% when the concentration of $AlCl_3$ was 0.09 grams per gram of $Al_2O_3$. This example clearly demonstrates that, compared to the method of U.S. Pat. No. 4,055,509, a much smaller amount of salt can be used to obtain a highly dispersible alumina.

EXAMPLE 2

Figure 2:
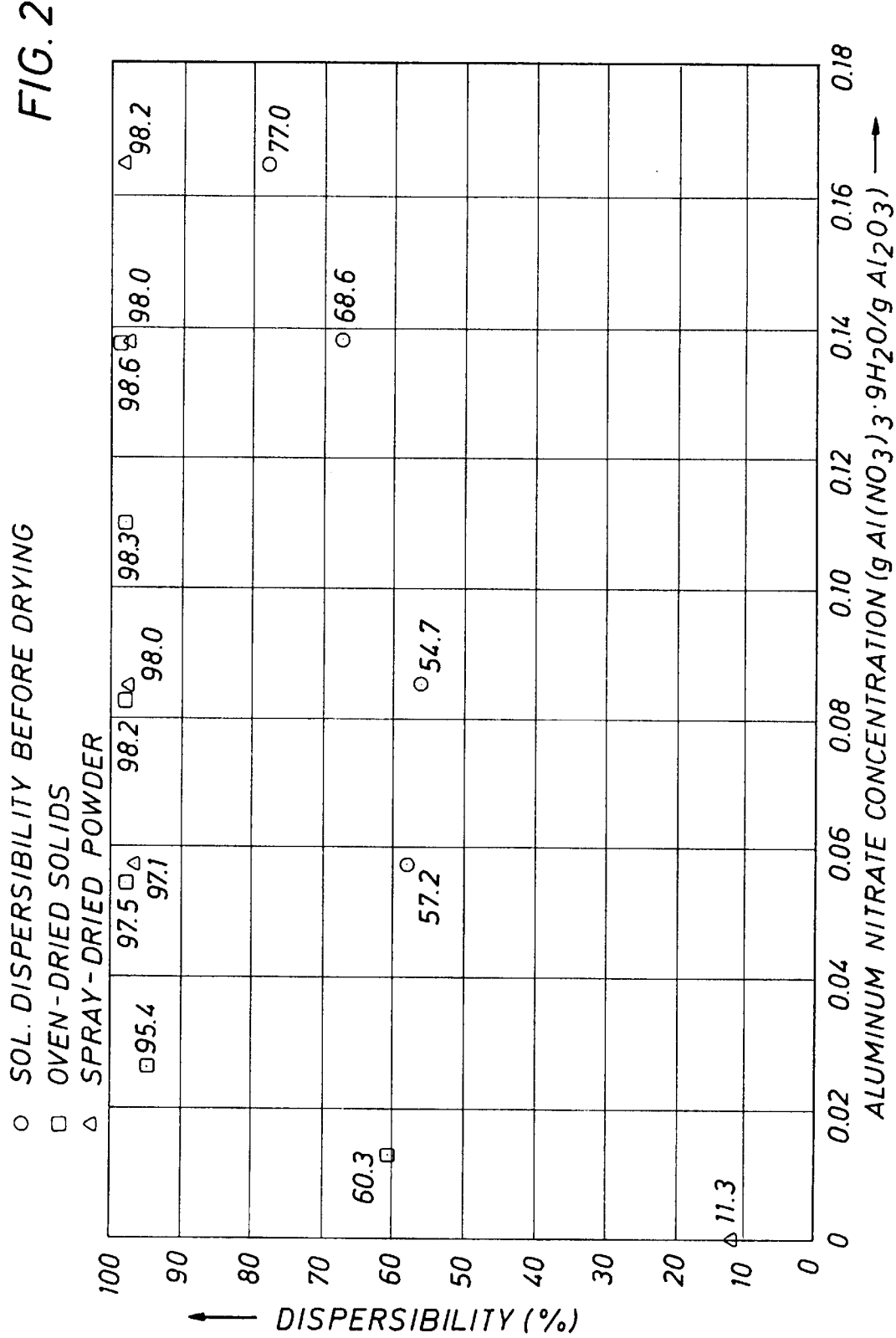
FIG. 2 is a graph comparing the water dispersibility of an alpha-alumina monohydrate sol containing aluminum nitrate with dried solids or powder produced from the sol in accordance with the process of the present invention.

Sols comprised of water, aluminum nitrate, and CATAPAL® D, an alpha-alumina monohydrate marketed by CONDEA Vista Company, were prepared. The aluminum nitrate concentrations ranged from 0.06 to 0.10 g $Al(NO_3)_3 \cdot 9H_2O$/g $Al_2O_3$. In two cases, the sols were dried either by pan-drying at 60° C. for several hours or spray drying at an inlet temperature of 340° C. and an outlet temperature of 110° C. with a residence time of a few seconds. In a third case, the dispersibility of the CATAPAL® D alumina in the sol (undried) was determined. The results are shown in FIG. 2. As can be seen from FIG. 2, in the undried sol of CATAPAL® D alumina and aluminum nitrate, the dispersibility reaches a maximum of 77% at a concentration of approximately 0.17 grams of $Al(NO_3)_3 \cdot 9H_2O$/g $Al_2O_3$, whereas in the case where the sol was dried, either by oven drying or spray drying, dispersibility increased dramatically to as much as 98.2%. More importantly, throughout the entire range of aluminum nitrate addition, dispersibility was greater than 95% in the case of the dried materials, whereas in the case of the aluminum sol itself, dispersibility ranged from a low of 54.7% to a high of 77.0%. It is particularly to be noted that at lower concentrations of the aluminum nitrate, the difference in dispersibility was particularly dramatic, ranging from approximately 57% at 0.06 g $Al(NO_3)_3 \cdot 9H_2O$/g $Al_2O_3$ to greater than 97% at the same aluminum nitrate/alumina ratio.

EXAMPLE 3

Figure 3:
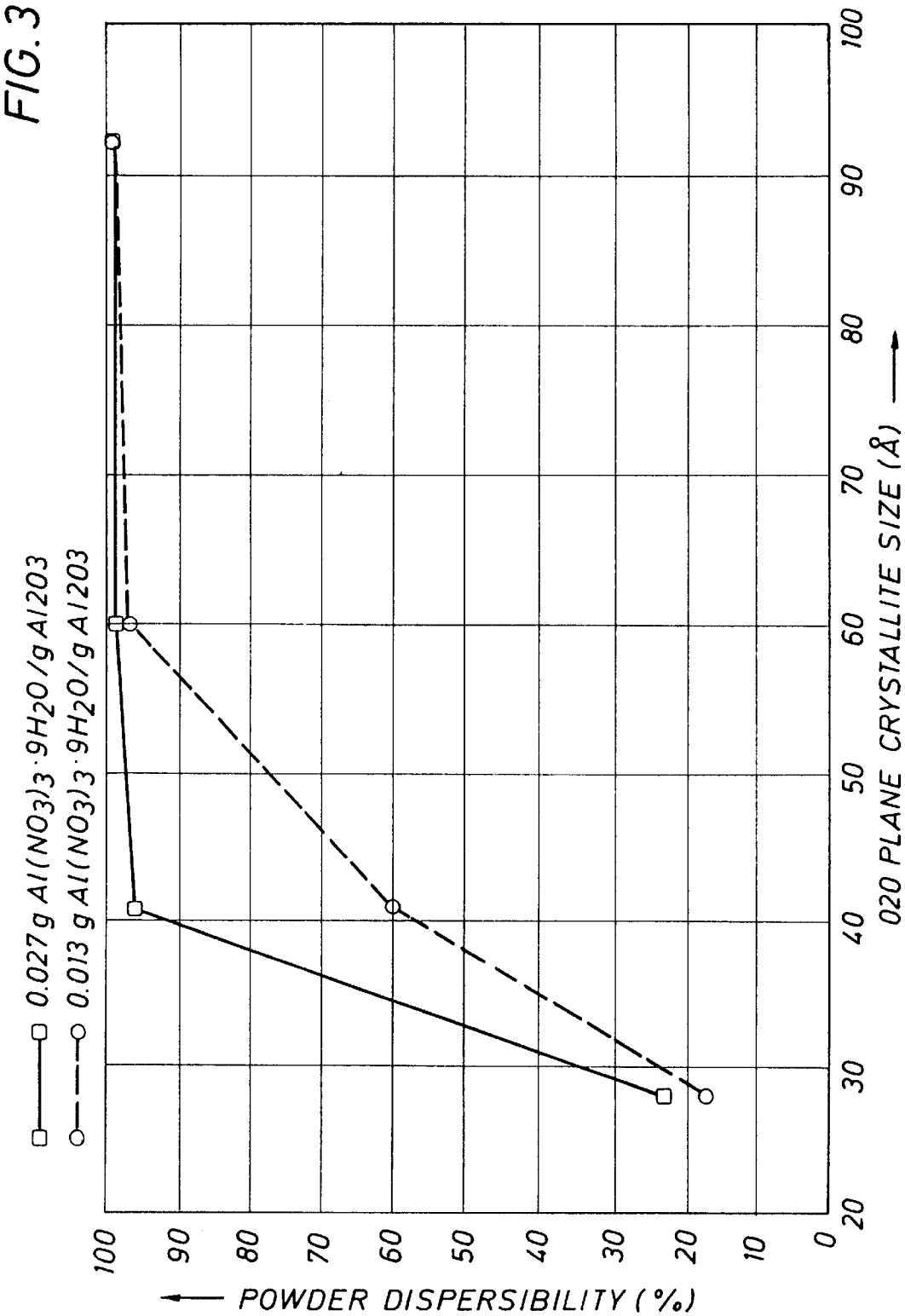
FIG. 3 is a graph illustrating the relationship between dispersibility, crystallite size, and aluminum nitrate concentration of alpha-alumina monohydrate having enhanced dispersibility prepared according to the process of the present invention.

This example demonstrates the dependence of dispersibility on the crystallite size and the dispersibility enhancer concentration. Mixtures of alpha-alumina monohydrates of various crystallite sizes were mixed with given amounts of aluminum nitrate and pan-dried at 60° C. to remove free water. The resulting powder was then mixed with water to determine the dispersibility. The results are shown in FIG. 3. As can be seen from FIG. 3, as the crystallite size of the alumina increases, the dispersibility increases. Like results are seen with respect to the aluminum nitrate concentration; i.e., as aluminum nitrate concentration increase, dispersibility increases.

EXAMPLE 4

Figure 4:
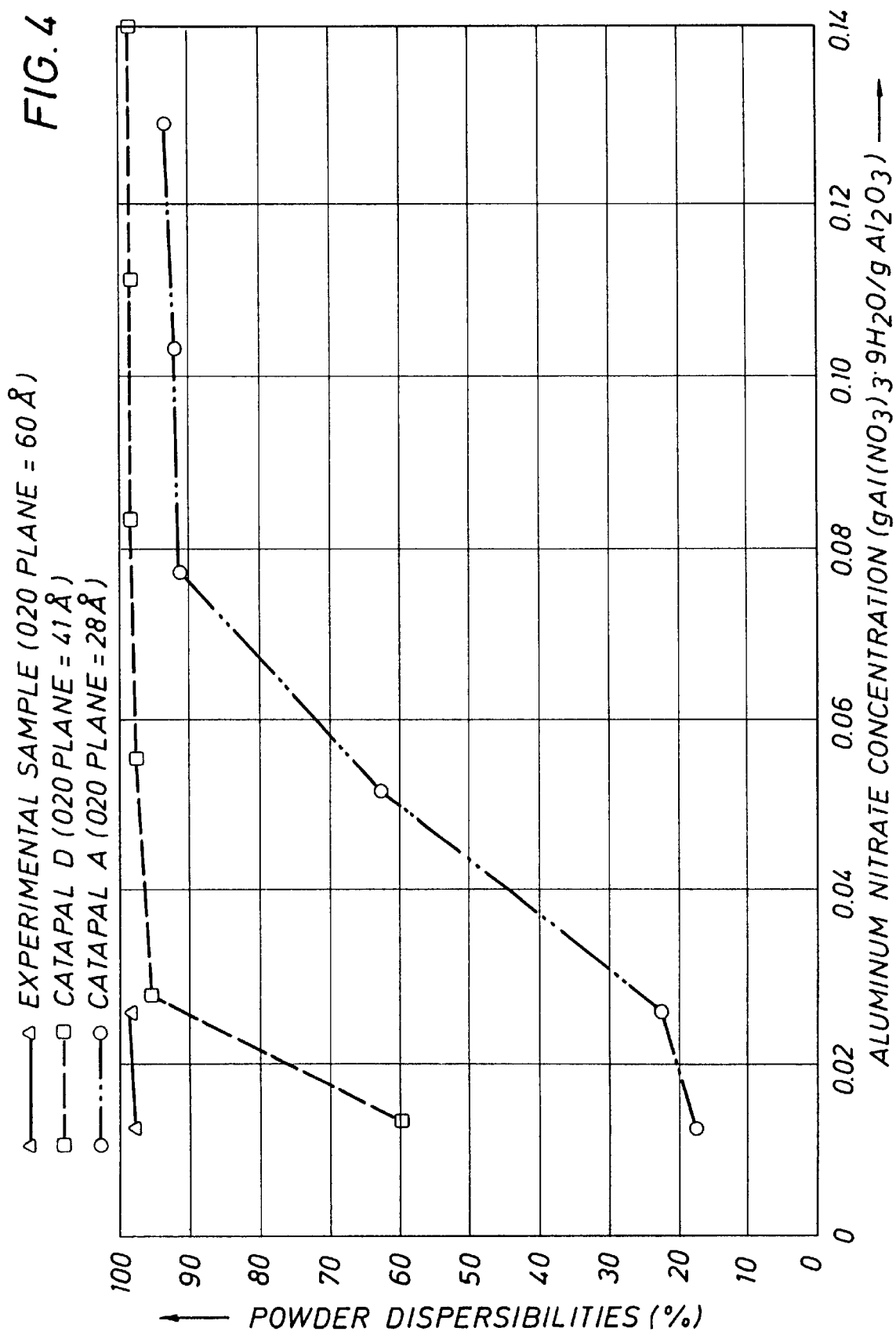
FIG. 4 illustrates the effect of aluminum nitrate concentration on dispersibility.

This example demonstrates the effect of the concentration of dispersibility enhancer on dispersibility. Three sets of alpha-alumina monohydrate samples with various crystallite sizes were employed. One was an experimental sample having a crystallite size, 020 plane, of 60 Å, one was a CATAPAL® D alumina having a crystallite size, 020 plane, of 41 Å, and one was a CATAPAL® A alumina having a crystallite size, 020 plane, of 28 Å. The slurries of the alumina described above were mixed with varying amounts of aluminum nitrate and then pan-dried at 60° C. The results are shown in FIG. 4. As can be seen from FIG. 4, at low concentrations of aluminum nitrate, the greater the crystallite size, the greater the dispersibility. Further, as the concentration of aluminum nitrate increases, the dispersibility increases. As can also been seen from FIG. 4, there appears to be a relatively sharp transition region where the dispersibility rises significantly for small changes in aluminum nitrate concentration. This concentration region is dependent on crystallite size. For example, the sharp increase in dispersibility occurs over an aluminum nitrate concentration range of 0.03 to 0.08 g $Al(NO_3)_3 \cdot 9H_2O$/g $Al_2O_3$ for an alumina with a crystallite size of 28 Å (020plane). However, the transition region for an alumina with a crystallite size of 41 Å occurs over a concentration range of 0.01 to 0.03 g $Al(NO_3)_3 \cdot 9H_2O$/g $Al_2O_3$.

EXAMPLE 5

This example demonstrates dispersibility results achieved by the process of the present invention using a variety of dispersibility enhancers. Aqueous sols of CATAPAL® B and various dispersibility enhancers were prepared. The dispersibility of the alumina in the sol was measured, as well as the dispersibility of the powders obtained by pan-drying the sols at 60° C. The results are shown in Table 1 below.

TABLE

Effect of Various Other Additives on Dispersibility of CATAPAL ® B

| Additive | Concentration 1 (g additive/g $Al_2O_3$) | Sol Dispersibility (%) | Powder Dispersibility (%) | Concentration 2 (g additive/g $Al_2O_3$) | Sol Dispersibility (%) | Powder Dispersibility (%) |
|---|---|---|---|---|---|---|
| $HNO_3$ | 0.050 | 51.4 | 97.0 | 0.100 | 98.1 | 98.2 |
| $Fe(NO_3)_2 \cdot 9H_2O$ | 0.051 | <10 | 33.8 | 0.102 | 18.1 | 97.0 |
| $ZrO(NO_3)_3$ (in $HNO_3$) | 0.037 | 12.3 | 53.6 | 0.076 | 51.2 | 92.8 |
| $La_2(NO_3)_3$ | 0.037 | 10.1 | 22.6 | 0.073 | <10 | 23.0 |
| $Ce_2(NO_3)_3$ | 0.037 | 12.1 | 16.4 | 0.075 | 11.7 | 21.4 |
| $NaNO_3$ | 0.050 | <10 | 16.7 | 0.101 | <10 | 13.7 |
| $FeCl_3 \cdot 6H_2O$ | 0.050 | <10 | 49.3 | 0.100 | 37.8 | 98.3 |
| HCl | 0.025 | 36.2 | 95.1 | 0.050 | 78.7 | 98.2 |
| NaCl | 0.050 | <10 | <10 | 0.100 | <10 | <10 |
| $Fe_2(SO_4)_3 \cdot xH_2O$ | 0.050 | <10 | <10 | 0.100 | <10 | <10 |
| $Al_2(SO_4)_3 \cdot xH_2O$ | 0.050 | <10 | <10 | 0.100 | <10 | <10 |
| $Al(C_2H_3O_2)_3$ | 0.050 | <10 | 25.3 | 0.100 | <10 | 27.8 |

As can be seen from the data, powders obtained by the process of the present invention wherein the sol containing the dispersibility enhancer is dried show markedly greater water dispersibility as compared with the sols themselves. As can further be seen, combinations of ions such as $Fe^{+3}$ and $NO_3^{-1}$ will disperse alumina, but combinations of ions such as $Na^{+1}$ and $NO_3^{-1}$ will not. It is also apparent that multivalent anions such as $SO_4^{-2}$ are not suitable for dispersing alumina Table 1 also demonstrates that dramatic increases in dispersibility occur when using acids as dispersibility enhancers. For example, at a concentration of 0.025 g HCl/g $Al_2O_3$, the alumina dispersibility increases from 36% in the sol to 95% of the powder after drying the sol and re-dispersing the powder.

As the above examples clearly demonstrate, the process of the present invention provides a markedly improved method for increasing the dispersibility of alpha-alumina monohydrate. The method does not require long-term aging or aging at elevated temperatures and therefore is much more economical than processes such as disclosed in U.S. Pat. No. 4,676,928. Additionally, markedly enhanced dispersibility can be achieved without the use of acids such that neutral, dispersible aluminas can be prepared. Furthermore, the present invention is a marked improvement over the method disclosed in U.S. Pat. No. 4,055,509 inasmuch as lower concentrations of dispersibility enhancers, e.g., salts, are required. Additionally, as compared to the method of U.S. Pat. No. 4,055,509, which requires dry blending or mixing, the process of the present invention, which uses an aqueous dispersion, ensures a more homogeneous product.

The foregoing description and examples illustrate selected embodiments of the present invention. In light thereof, variations and modifications will be suggested to one skilled in the art, all of which are in the spirit and purview of this invention.

What is claimed is:

1. A method of increasing the dispersibility of alpha-alumina monohydrate comprising:

providing a slurry of alpha-alumina monohydrate, water, and a dispersibility enhancer selected from the group consisting of salts having the formula MX, wherein M is a polyvalent metal cation constituent for which the solubility product $K_{SP}$ of the corresponding metal hydroxide is less than $10^{-20}$ and wherein X is an anion constituent derived from a monovalent acid having an ionization constant $K_A$ greater than $10^{+1}$, phosphorus dichloride, phosphorus trichloride, phosphorus pentachloride, phosphorus tribromide, phosphorus pentabromide, and mixtures thereof, said slurry containing from 5 to 15% by weight alumina, calculated as $Al_2O_3$ and 0.5 to 10% by weight of dispersibility enhancer, based on the weight of alpha-alumina calculated as $Al_2O_3$; and drying said slurry at a temperature above 60° C. but less than the temperature at which bound water is removed to substantially remove free water and produce a dried powder of alpha-alumina monohydrate having a dispersibility in water such that at a level of $AlCl_3$, as a dispersibility enhancer, of 0.03 g of $AlCl_3$ per g of $Al_2O_3$ in said dried powder, said dried powder is at least 90% dispersible.

2. The process of claim 1 wherein M is a polyvalent metal cation constituent selected from the group consisting of $Sc^{+3}$, $Y^{+3}$, $Nd^{+3}$, $Sn^{+3}$, $Eu^{+3}$, $Gd^{+3}$, $Er^{+3}$, $Tm^{+3}$, $Yb^{+3}$, $Lu^{+3}$, $Ti^{+3}$, $Zr^{+4}$, $Th^{+3}$, $Cr^{+3}$, $U^{+4}$, $Mn^{+3}$, $Fe^{+3}$, $Co^{+3}$, $Ru^{+3}$, $Pd^{+2}$, $Pt^{+2}$, $Au^{+3}$, $Al^{+3}$, $Ga^{+3}$, $In^{+3}$, $Sn^{+2}$, $Sn^{+4}$, $Bi^{+3}$, and wherein x is an anion constituent derived from a monovalent acid and is selected from the group consisting of Cl-, $NO_3$-, I-, $ClO_3$, $ClO_4$, Br-, $MnO_4$-.

3. The process of claim 1 wherein M is selected from the group consisting of $Sn^{+3}$, $Ti^{+3}$, $Cr^{+3}$, $Mn^{+3}$, $Fe^{+3}$, $Co^{+3}$, $Pd^{+2}$, $Pt^{+2}$, $Au^{+3}$, $Al^{+3}$, $Sn^{+2}$, $Sn^{+4}$, and $Bi^{+3}$.

4. The method of claim 3 wherein X is selected from the group consisting of Cl- $NO_3$, I-, and Br-.

5. The method of claim 1 wherein said dispersibility enhancer is selected from the group consisting of phosphorus dichloride, phosphorus trichloride, phosphorus pentachloride, and antimony pentachloride.

6. The process of claim 1 wherein said alpha-alumina monohydrate contains up to 81% by weight $Al_2O_3$.

7. The process of claim 1 wherein said alpha-alumina monohydrate contains up to 78% by weight $Al_2O_3$.

8. The process of claim 1 wherein said alpha-alumina monohydrate contains from 68 to 78% by weight $Al_2O_3$.

* * * * *